Oct. 14, 1958     D. D. PEEBLES     2,856,318
LACTOSE PRODUCT AND PROCESS OF MANUFACTURE
Filed May 29, 1956
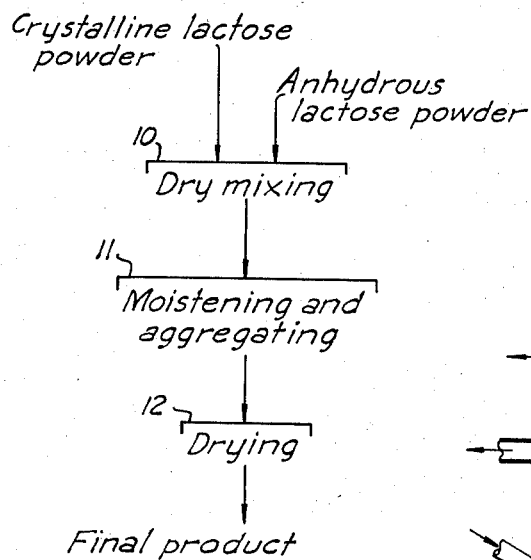
FIG_1_
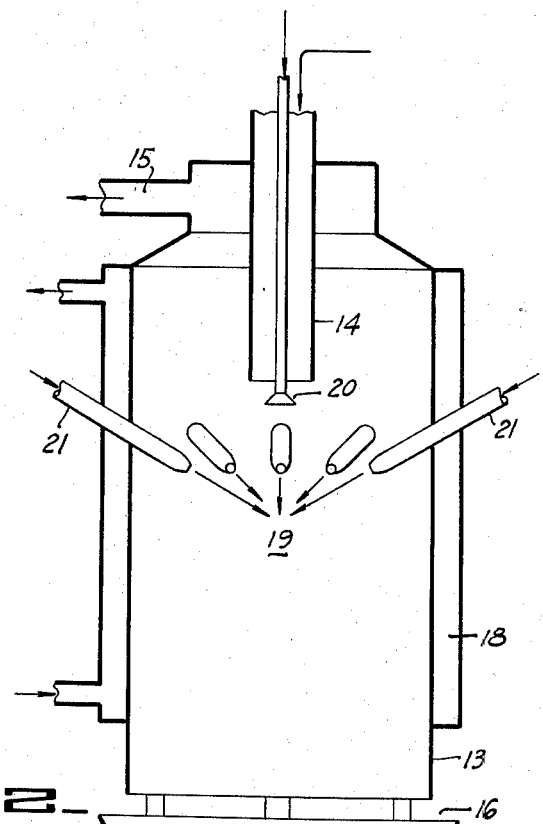
FIG_2_
INVENTOR
David D. Peebles
BY
ATTORNEYS

United States Patent Office

2,856,318
Patented Oct. 14, 1958

2,856,318

LACTOSE PRODUCT AND PROCESS OF MANUFACTURE

David D. Peebles, Davis, Calif., assignor to Foremost Dairies Inc., San Francisco, Calif., a corporation of New York Application May 29, 1956, Serial No. 588,175

3 Claims. (Cl. 127—31)

This invention relates generally to products comprising primarily lactose or milk sugar, and to processes for manufacturing the same.

Several grades of lactose or milk sugar are manufactured commercially from cheese or casein whey (see for example Peebles et al. 2,439,612). Depending upon the degree of purity the lactose is sold as technical (including commercial or crude lactose), edible for human consumption, and U. S. P. grades. Dry technical lactose is generally sold as a coarse crystalline material. The purer forms of lactose suitable for human consumption are in the form of fine powder made by grinding alpha lactose monohydrate crystals, or by spray drying a lactose solution. In either event the material is not free flowing, and it has the objectionable characteristic of being dusty. The dense coarse crystalline form is not suitable for human consumption because of the time required to dissolve the material, and because it tends to settle from other powdered materials with which it may be mixed.

In general it is an object of the present invention to provide a dry divided lactose which can be easily and quickly dissolved in cold or hot water, and which has good free flowing properties.

Another object of the invention is to provide a product of the above character which can be marketed to the domestic trade for use in formulating with milk and other edible ingredients.

Another object of the invention is to provide a novel process for manufacturing the above product.

Additional objects and features of the invention will appear from the following description in which the preferred embodiment of the invention has been set forth in detail in conjunction with the accompanying drawing.

Referring to the drawing:

Figure 1 is a flow sheet illustrating one procedure for carrying out the invention.

Figure 2 is a side elevational view in section schematically illustrating suitable equipment for aggregating the lactose powder.

In accordance with the present invention I employ a crystalline lactose powder having relatively small particle size, as for example a powder having a particle size such that the majority of the material passes through a 100 mesh screen. Such a powder can be readily made by spray drying a suspension of very fine lactose crystals or by grinding a coarser crystalline material. The moisture content of the crystalline product can be of the order of 5.2 to 6.0 percent (total). The crystalline powder is dry mixed with a smaller amount of anhydrous lactose powder, or in other words a powder having its lactose in amorphous form. Such a powder can be manufactured by spray drying a concentrated lactose solution. It is likewise desirable that the anhydrous powder have a relatively small particle size, as for example a size such that the majority of the material passes through a 100 mesh screen. After dry mixing the crystalline and anhydrous powders, the mix is processed as by means of the equipment shown in Figure 2, whereby the particles are moistened, and the moist particles caused to contact and adhere together in the form of moist random aggregates. The moistening and aggregating operation is carried out in such a manner that the crystalline particles of lactose are not affected, or in other words are not melted or dissolved. However the anhydrous lactose particles are made sticky by the added moisture, and serve as a sticky medium to cause the crystalline particles to adhere together in the form of random aggregates. After the porous aggregates have been formed, the material is subjected to final drying to reduce the moisture content to the value desired in the final product.

The foregoing steps are illustrated in Figure 1. The crystalline and anhydrous powders are dry mixed at 10 and then supplied to the moistening and aggregating operation 11. Excess moisture is removed from the aggregates in step 12 to produce the final product.

The equipment illustrated in Figure 2 for carrying out the moistening and aggregating operation, consists of a vertical chamber 13 having a downwardly extending inlet conduit 14 for receiving powdered lactose as conveyed pneumatically from a suitable supply source. Some air is removed from the chamber through conduit 15, whereby air is drawn into the chamber through the lower opening 16 between the main part of the chamber and the discharge hopper 17. The sides of the chamber can be kept warm by circulating warm air through the jacket 18, thereby preventing the condensing of moisture on the inner chamber surfaces.

The dispersed powder passes through zone 19 where it is co-mingled with finely atomized water discharged from nozzle 20. Also some saturated steam is introduced by way of nozzles 21. The falling powder acquires moisture from the water droplets and water vapor whereby the material discharged upon the conveyor 22 has a predetermined moisture content. Good results have been secured when the material discharging from hopper 17 has a total moisture content of the order of from about 10 to 16 percent, from 12 to 14 percent being deemed optimum.

The temperature level within the zone 19 can be adjusted by adjusting the proportioning between the water and the steam introduced. Good results have been secured by maintaining an average temperature level within the zone 19 of the order of from 100° to 150° F., about 130° F. being optimum.

As the praticles of powdered lactose are co-mingled with the vapor and atomized water in zone 19, moisture distributes itself on the surfaces of the particles. The time period and treatment temperature within the zone is such that the small lactose crystals are not affected to any substantial extent. However the small particles of anhydrous lactose become relatively sticky, whereby they serve as a sticky medium to cause adherence between the crystalline particles, when the latter are brought into random physical contacts. Sufficient co-mingling takes place within the treatment zone whereby the particles are brought into repeated direct contact, with the result that the particles adhere together in the form of random aggregates. The time period of treatment in the equipment of Figure 2 may range from about 10 to 60 seconds.

Immediately after the aggregates are formed and before they have been discharged from hopper 17, some of the sticky lactose commences to crystallize, thereby making the aggregates stronger and less susceptible to breakage. Such crystallization is likewise accompanied by reduction in surface stickiness, whereby the aggregates discharged upon conveyer 22 do not tend to adhere together in the form of a cake. While in transit on conveyer 22, the aggregates are held in a quiescent and compact mass, and this holding period, which may range from about 30 to 90 seconds, during which there is a reduction in temperature (e. g. from 100° to 90° F.), serves to affect a further reduction in surface stickiness with an increase in the strength of the aggregates.

The conveyer 22 delivers the material in free flowing form to the equipment used for final drying. This equipment is such as to avoid any substantial amount of crushing or grinding of the aggregates. Suitable equipment for this purpose employs a screen provided with small perforations, and which is vibrated to cause the material to progress from the feed to the discharge end of the same, and to apply vertical motion to maintain the powder as a loose working layer. In conjunction with the vibrating action, warm drying air is delivered upwardly through the screen to pass upwardly through the layer of powder. The number and size of the openings in the screen is so chosen in relation to the rate of air delivery therethrough that the product moving along the screen is fluffed or levitated to form a layer several times the thickness it would normally have if at rest. By this technique the product is caused to progress along the screen and is at least partially supported by the cushion of air intermingled therewith. This provides drying without rough or mechanical handling which might break up the powder aggregates.

The final product from the dryers may be subjected to screening and sizing operations, to produce a material of relatively uniform size requirements. A typical product made in accordance to the present process has a particle size such that the bulk of the material passes through a 20 mesh screen, but remains on an 80 mesh screen. Any small amount of material passing through an 80 mesh screen can be rejected or returned to the process, as for example to the mixing operation 10.

As previously mentioned the anhydrous lactose powder comprises a minor percentage of the total dry mix being supplied to the apparatus of Figure 2. For example good results have been obtained when the anhydrous powder comprises from about 20 to 30 percent of the dry mix, about 25 percent being optimum. When too small an amount of anhydrous powder is employed, the aggregates formed are relatively weak. An excessive amount of anhydrous powder causes excessive stickiness, thus interfering with proper continuous operation of the apparatus of Figure 2.

The product made in accordance with the foregoing process has a number of desirable characteristics. It is granular and relatively free flowing, thus facilitating packaging in cartons of the type provided with a pouring spout. When introduced into either cold or hot water, it quickly wets and dissolves. The rate of solution is relatively high because of the absence of large lactose crystals. As view microscopically the fragments are in the form of aggregates comprising small crystals of the original crystalline powder, cemented together in random fashion by crystallized lactose corresponding to that originally present in the anhydrous powder. Water freely penetrates a mass of such material and the pores of the individual aggregates, whereby the rate of solution is governed by the size of the individual lactose crystals, rather than the size of the aggregates. Lactose is not caramelized or otherwise detrimentally affected by treatment in the apparatus of Figure 2. In typical instances the bulk density of the product may range from about 350 to 450 gms. per liter. At least about 80 percent or more of the lactose is in the form of alpha monohydrate.

By way of example, in one particular instance the process was operated as follows: An edible lactose powder was prepared by grinding a coarse crystalline lactose. After grinding the particle fineness was such that 100 percent of the material passed through a 100 mesh screen, and 40 percent through a 200 mesh screen. This material had a moisture content (total) of about 5.8 percent. Seventy-five parts of such ground crystalline lactose was dry mixed with twenty-five parts (by weight) of anhydrous lactose powder. The anhydrous powder was produced by spray drying a lactose concentrate. The anhydrous powder had a particle fineness such that 100 percent of the material passed through a 100 mesh screen and 60 percent through a 200 mesh screen. It had a moisture content (total) of about 1.5 percent. The dry mix was then supplied continuously to the apparatus of Figure 2, with atomized water and steam being introduced into zone 19 to maintain this zone at an average temperature of about 130° F. The aggregates being delivered from the hopper 16 had a moisture content (total) of about 13.0 percent. The holding time during transit upon the conveyer 22 was about 50 seconds. The drying apparatus employed was of the type previously described, with an inlet temperature for the drying air of about 275° F. A screen analysis of the final product was as follows:

| | Percent |
|---|---|
| On 20 mesh screen | 0 |
| Through 20 on 28 mesh screen | 13.4 |
| Through 28 on 35 mesh screen | 35.0 |
| Through 35 on 50 mesh screen | 30.0 |
| Through 50 on 60 mesh screen | 9.4 |
| Through 60 on 80 mesh screen | 9.4 |
| Through 80 on 100 mesh screen | 2.8 |
| Through 100 | Trace |

The final product had a moisture content (total) of about 4.5 percent, and a bulk density of about 390 grams per liter. It was a white free flowing material that was readily wettable, and which dissolved rapidly in either hot or cold water.

I claim:
1. In a process for the manufacture of dry lactose, continuously supplying a dry mix of crystalline and anhydrous lactose powders to a treatment zone, said powders being in the proportions of 80 to 70% of the crystalline lactose to about 20 to 30% of the anhydrous lactose, the particle size of both powders being such that the majority of the particles pass through a 100 mesh screen, causing the particles of the mix to progress in dispersed condition through said zone, continuously supplying moisture to said zone whereby the particles are moistened and caused to contact together to form aggregates, the temperature within said zone being of the order of about 100° to 150° F., the amount of moisture added in said zone being such that the material is caused to contain from 10 to 16% total moisture, removing the aggregates from said zone and then removing excess moisture from the aggregates.

2. As a new article of manufacture, a dry divided lactose, the individual fragments being aggregates comprising relatively smaller crystals of lactose cemented together in random fashion by additional lactose, said product having a bulk density of about 350 to 450 grams per liter, the aggregates being of such size that the bulk of the same pass through a 20 mesh screen but remain on an 80 mesh screen, said product having a total moisture content of about 4.5% and having about 80% or more of the same in the form of alpha monohydrate, the product being further characterized by the fact that it is readily wettable and quickly dissolves in cold or hot water.

3. In a process for the manufacture of dry lactose in the form of porous aggregates the bulk of which pass through a twenty mesh screen but remain on an eighty mesh screen, continuously supplying a dry mix of crystalline and anhydrous lactose powders to a treatment zone, said powders having a particle size substantially less than the particle size of said aggregates and being in the proportions of 80 to 70% of the crystalline lactose to about 20 to 30% of the anhydrous lactose, causing the particles of the mix to progress in dispersed condition through said zone, continuously supplying moisture to said zone whereby the particles are moistened and caused to contact together to form aggregates, the temperature within said zone being of the order of about 100° to 150° F., the amount of moisture added in said zone being such that the material is caused to contain from 10 to 16% total moisture, removing the aggregates from said zone and then removing excess moisture from the aggregates.

References Cited in the file of this patent

UNITED STATES PATENTS

| | | |
|---|---|---|
| 2,088,606 | Peebles et al. | Aug. 3, 1937 |
| 2,243,381 | Klopfer | May 27, 1941 |
| 2,299,287 | Whymper | Oct. 20, 1942 |
| 2,299,288 | Whymper | Oct. 20, 1942 |
| 2,373,919 | Schweiger | Apr. 17, 1945 |
| 2,627,463 | Meade | Feb. 3, 1953 |